(12) United States Patent
Reiter

(10) Patent No.: US 9,974,294 B2
(45) Date of Patent: May 22, 2018

(54) SIMPLE TRIGGERING TIP-UP DEVICE

(71) Applicant: Thomas John Reiter, Mosinee, WI (US)

(72) Inventor: Thomas John Reiter, Mosinee, WI (US)

( * ) Notice: Subject to any disclaimer, the term of this patent is extended or adjusted under 35 U.S.C. 154(b) by 271 days.

(21) Appl. No.: 15/138,038

(22) Filed: Apr. 25, 2016

(65) Prior Publication Data

US 2017/0303522 A1 Oct. 26, 2017

(51) Int. Cl.
*A01K 97/01* (2006.01)
*A01K 97/10* (2006.01)
*A01K 97/12* (2006.01)

(52) U.S. Cl.
CPC .............. *A01K 97/01* (2013.01); *A01K 97/10* (2013.01); *A01K 97/12* (2013.01)

(58) Field of Classification Search
CPC ......... A01K 97/01; A01K 97/10; A01K 97/12
See application file for complete search history.

(56) References Cited

U.S. PATENT DOCUMENTS

| | | | |
|---|---|---|---|
| 3,199,241 A * | 8/1965 | Mauritz ................. | A01K 97/12 43/17 |
| 3,474,561 A * | 10/1969 | McConkey ............ | A01K 97/01 43/16 |
| 5,050,333 A | 9/1991 | Debreczeni | |
| 5,152,093 A * | 10/1992 | Bartys ................... | A01K 97/01 248/520 |
| 5,269,088 A * | 12/1993 | Slaback, Jr. ........... | A01K 97/12 43/17 |
| 5,551,183 A | 9/1996 | Solem | |
| 5,890,312 A * | 4/1999 | Ball ....................... | A01K 97/01 43/15 |
| 5,911,569 A * | 6/1999 | Isakson .................. | A01K 97/01 43/17 |
| 6,594,941 B1 | 7/2003 | Anderson | |
| 7,322,148 B2 | 1/2008 | Coulman | |
| 7,716,867 B2 | 5/2010 | Dungan | |
| 8,701,333 B2 | 4/2014 | Christianson | |
| 2007/0017141 A1 * | 1/2007 | Coulnnan .............. | A01K 97/01 43/17 |
| 2011/0056112 A1 * | 3/2011 | Christianson .......... | A01K 97/01 43/17 |

* cited by examiner

Primary Examiner — Christopher R Harmon

(57) ABSTRACT

A simple triggering tip-up device, for use with a conventional ice fishing rod and reel, includes a base, a rod holder, an indicator flag, and a trigger mechanism. The base provides a stable platform for the rod holder and indicator flag to be removably attached to one end and a U-shaped trigger mechanism is rotatably mounted at the other end. The trigger mechanism has a long leg on one end and a short leg on the opposite end. The long leg secures a fishing line being fed from a reel with an open bail while the short leg holds the indicator flag in the "set" position. The action of a fish pulling the line raises the legs of the trigger mechanism causing stored energy from the flag shaft to be released resulting in the release of both the indicator flag and the fishing line. Although the present invention primarily relates to ice fishing it would not be unreasonable to apply this invention to open water fishing. Conventional open water fishing rods could be used with this device when set on a dock, in a boat, or on the shore line.

16 Claims, 4 Drawing Sheets

SIMPLE TRIGGERING TIP-UP DEVICE

CROSS-REFERENCE TO RELATED APPLICATIONS

This application claims the benefit of Provisional Patent Application No. 62/231,906, filed 2015 Jul. 20 by the present inventor.

BACKGROUND OF INVENTION

This invention relates to creating a more enjoyable and productive ice fishing experience with a device that improves upon conventional ice fishing tactics. More specifically it relates to a device that can be used with a conventional ice fishing rod and reel that signals to an angler when a fish has taken the bait. It also relates to a device that has a simple trigger design that is almost undetectable to the fish. The unique trigger design utilizes the indicator flag shafts stored energy to provide resistance to the trip mechanism as well as assist in the release of the fishing line. Traditional ice fishing equipment consists of devices with a spool of line, a trip device, and an indicator flag (tip ups) and make no use of the flag shafts energy in there operation. Another option is a balanced jig pole on a supporting structure that tips down when a fish strikes (tip down). The one common aspect of all these devices is that when a fish takes the bait the fish is retrieved by pulling the line in by hand. Once the fish has been retrieved on a tip up, the excess line lays on the ice in a tangled frozen mess and needs to be wound back onto the spool of the tip up. In the case of tip downs the line typically gets caught on ice particles (created during the drilling of the hole) making it difficult to lower the line back into the water.

Trip mechanisms of conventional tip ups can be inconsistent and are difficult for smaller fish to trip. Many times smaller fish will take the bait and never trip the device. Often, at the conclusion of fishing, the user discovers that either the hook is bare or a small fish has been hooked without ever tripping the device. Conventional underwater tip-ups make up the majority of all tip-up devices and consist of a spool of fishing line attached to a metal rod that is encased in a grease filled metal tube with a trip T attached to its end. When the fish pulls on the line the spool rotates and the metal rod spins within its tube rotating the trip T and setting the alert flag free. This design requires periodic maintenance as the grease tube and rod need to be disassembled, cleaned and re-greased to assure smooth operation. If not maintained the spool will not spin freely rendering the device useless.

Although the present invention primarily relates to ice fishing it would not be unreasonable to apply this invention to open water fishing. Conventional open water fishing rods could be used with this device when set on a dock, in a boat, or on the shore line.

From this it is apparent that it would be beneficial to introduce a tip-up device with a simple trigger mechanism that utilizes the flag shafts stored energy and can be used with a conventional ice fishing rod and reel.

Prior art fishing devices of this type do exist. U.S. Pat. No. 6,594,941 issued to Anderson discloses a collapsible rod holder with indicator flag. Issues with this design are that a pivot rod needs to be affixed to the fishing rods pivot point and the fishing rod is placed on the holder upside down. The pivoting or pulling down of the fishing rod from a fish strike releases the flag. If the rod is not balanced correctly on the rod holder a fish will detect the resistance and drop the bait.

U.S. Pat. No. 7,322,148 issued to Coulman discloses a rod holder with indicator flag and trip mechanism. The problem with this design is the line needs to be attached to an alligator clip release. This requires the user to experiment with where to place the line in the clip to be assured the device functions properly. If placed too loosely in the clip, the line may release without tripping the indicator flag. With the line placed tightly in the clip the indicator flag will be released, but the fish still needs to pull the line out of the clip which could result in the bait being dropped. Furthermore, the trip mechanism and flag need to be re-arranged on the device to accommodate a left handed or right handed reel.

U.S. Pat. No. 8,701,333 issued to Christianson discloses a base with a hole and slot configuration with the indicator flag and trigger mechanism coupled to it and the rod holder extends off of the base. This design attempts to solve the problem of the hole freezing over by designing the base to be positioned over the hole. The problem with this concept is that the hole and slot in the device are so large that to much air is exposed to the water and the hole begins to freeze over when temperatures are below freezing. The base would need to be pulled off the hole periodically to clear the ice and then set back in position. Further, this system requires the user to place a bobber stop and a slip loop on the fishing line that is used in conjunction with the trigger mechanism. The slip loop and bobber stop become problematic when ice begins to form in the hole. When a fish strikes the slip loop will catch on the ice creating unwanted resistance resulting in the fish dropping the bait.

In conclusion, it would be advantageous to provide an ice fishing device that provides a reliable and almost undetectable trigger design while indicating to the user the occurrence of a fish strike. The device makes use of the flag shafts stored energy to both ad tension to the trigger mechanism when needed and assist in its release. The device could make use of a fisherman's existing fishing rods whereby leaving them unattended until the device is triggered by a fish and signaling the occurrence of a bite.

SUMMARY OF THE INVENTION

The primary objectives of the present invention is to provide a fishing device that is simple enough to be used by even the most inexperienced of fishermen, designed to be triggered by a fish with little or no resistance, and can be quickly disassembled and made compact when not in use.

A further objective is that the user is not required to clip the fishing line to any part of the device or attach any hardware to the line.

It is a further objective to allow the user the ability to set an appropriate amount of tension on the trip mechanism when using various sized baits.

It is still a further objective of the present invention to provide a reliable signal to the user that a fish has taken the bait and that the device be used in conjunction with most commonly used ice fishing rods.

The present invention obtains these objectives with a rectangular base that provides a stable platform when placed on the surface of the ice. A removable rod holder and removable indicator flag are secured at one end of the base in opposing corners. A U-shaped trip mechanism constructed of a single piece of medium gauge wire having a long leg and a short leg is transversely mounted on the opposite end of the base. The trip mechanism is secured to the base by a solid collar protruding from the side of the base and a set of aligned snap clips protruding from the center of the base which allows it to rotate 180 degrees within its longitudinal axis. The long leg of the trip mechanism is approximately 4 times the length of the short leg and terminates with a 90 degree radius bend down. The long leg rests on the base providing an area between it and the base for securing a fishing line, the line being fed from a rod and reel placed in the rod holder to a baited hook beneath the ice. The short leg of the trip mechanism is bent 90 degrees away from the long leg a very short distance then loops up and around to run parallel with the long leg of the trip mechanism and terminates with a slight radius down. The short leg holds the indicator flag in the "set" position by means of a release loop and is released when a fish has taken the bait. A small o-ring can be slid back and forth on the short leg of the trip mechanism and serves as a backstop for the flags release loop. The tension of the indicator flag shaft provides various amounts of resistance to the trip mechanism depending on where the o-ring is placed. This enables the user to adjust the resistance on the trigger mechanism according to the size of the bait being used. A snap clip is positioned on the base adjacent to the long leg of the trip mechanism for the purpose of securing the trip mechanism down during storage.

A set of aligned stow hubs located along the length of the base provide for the rod holder and indicator flag to be slid in and secured down during storage.

An alternative design of the present invention is to bend the short leg of the trip mechanism only once at 90 degrees to run parallel with the long leg. The trip mechanism being mounted to the base by a pair of aligned eye-screws which allow it to rotate 180 degrees within its longitudinal axis. A slidable weight is attached to the long leg of the trip mechanism to provide resistance when larger bait is used. A tension/retainer clip is mounted to the base adjacent to the long leg of the trip mechanism to provide added tension when using very large bait and to also secure the trip mechanism during storage.

The following detailed description and drawings should provide a better understanding of the present invention.

Figure 1:
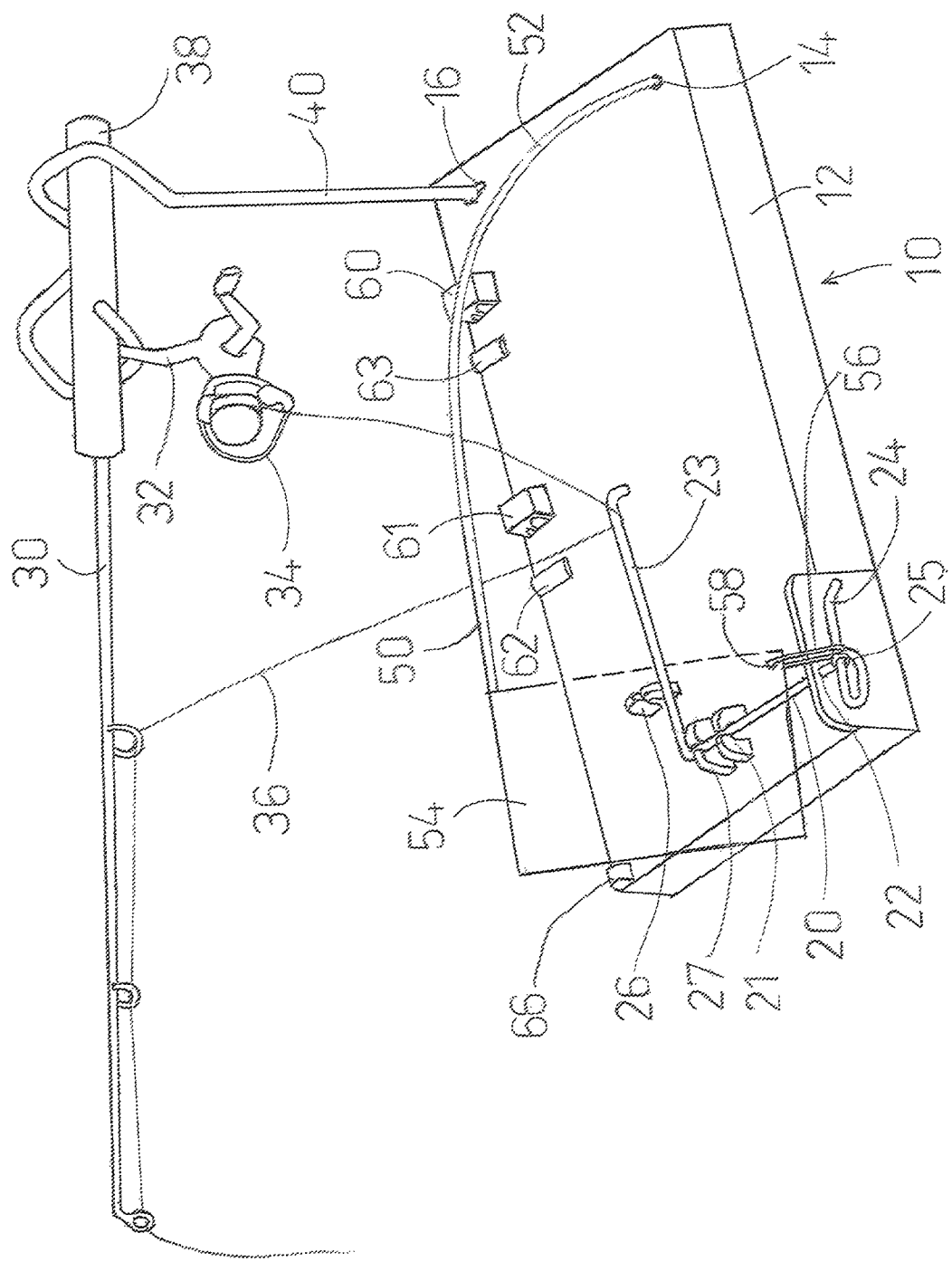
FIG. 1 is a top, front and right side view of the present invention in the "set" position showing the manner in which it is set up in conjunction with an ice fishing rod and reel prior to a fish taking the bait.
Figure 2:
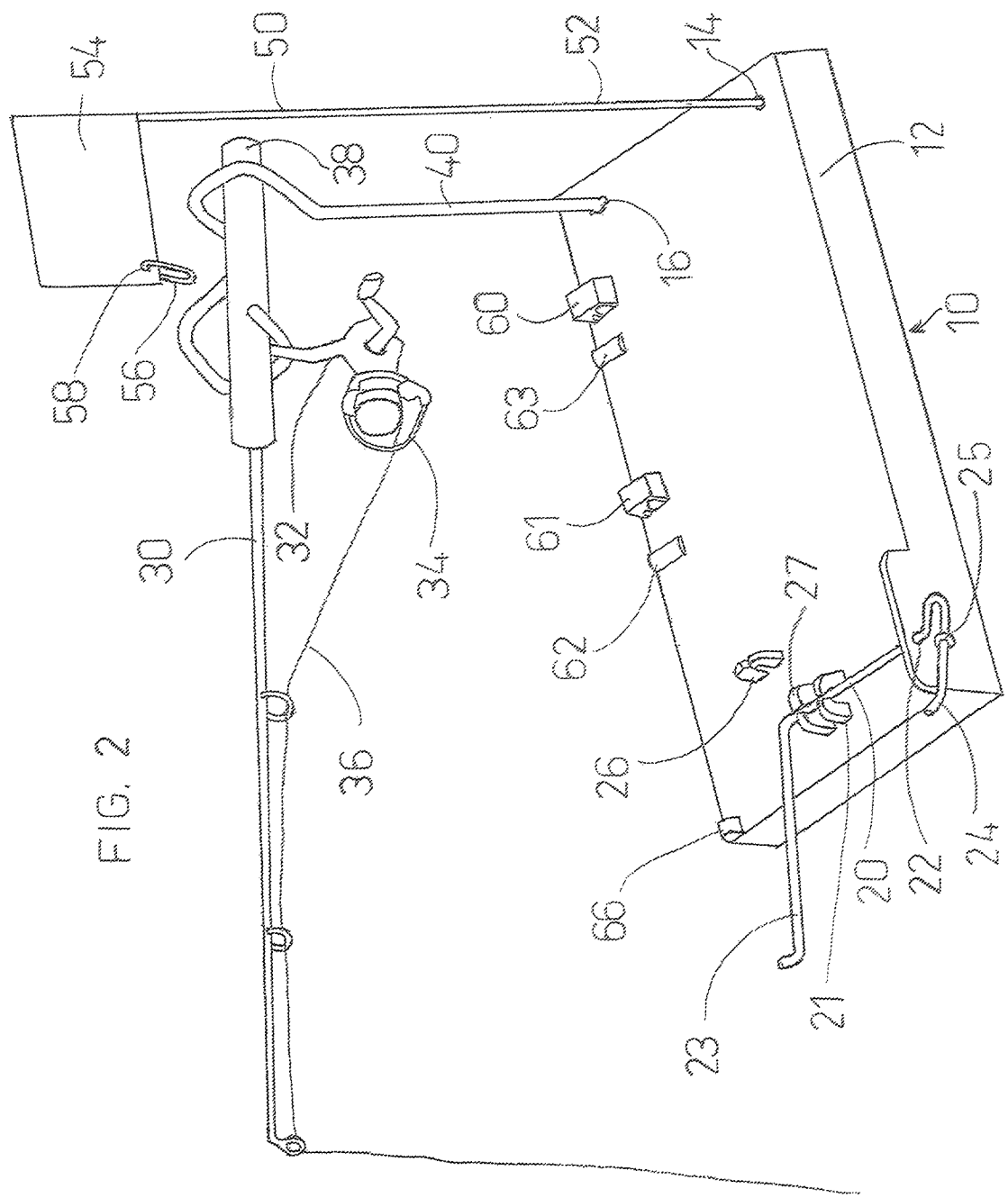
FIG. 2 is a view of the present invention illustrated in FIG. 1 and showing the position of the indicator flag, trip mechanism and fishing line after a fish has taken the bait.
Figure 3:
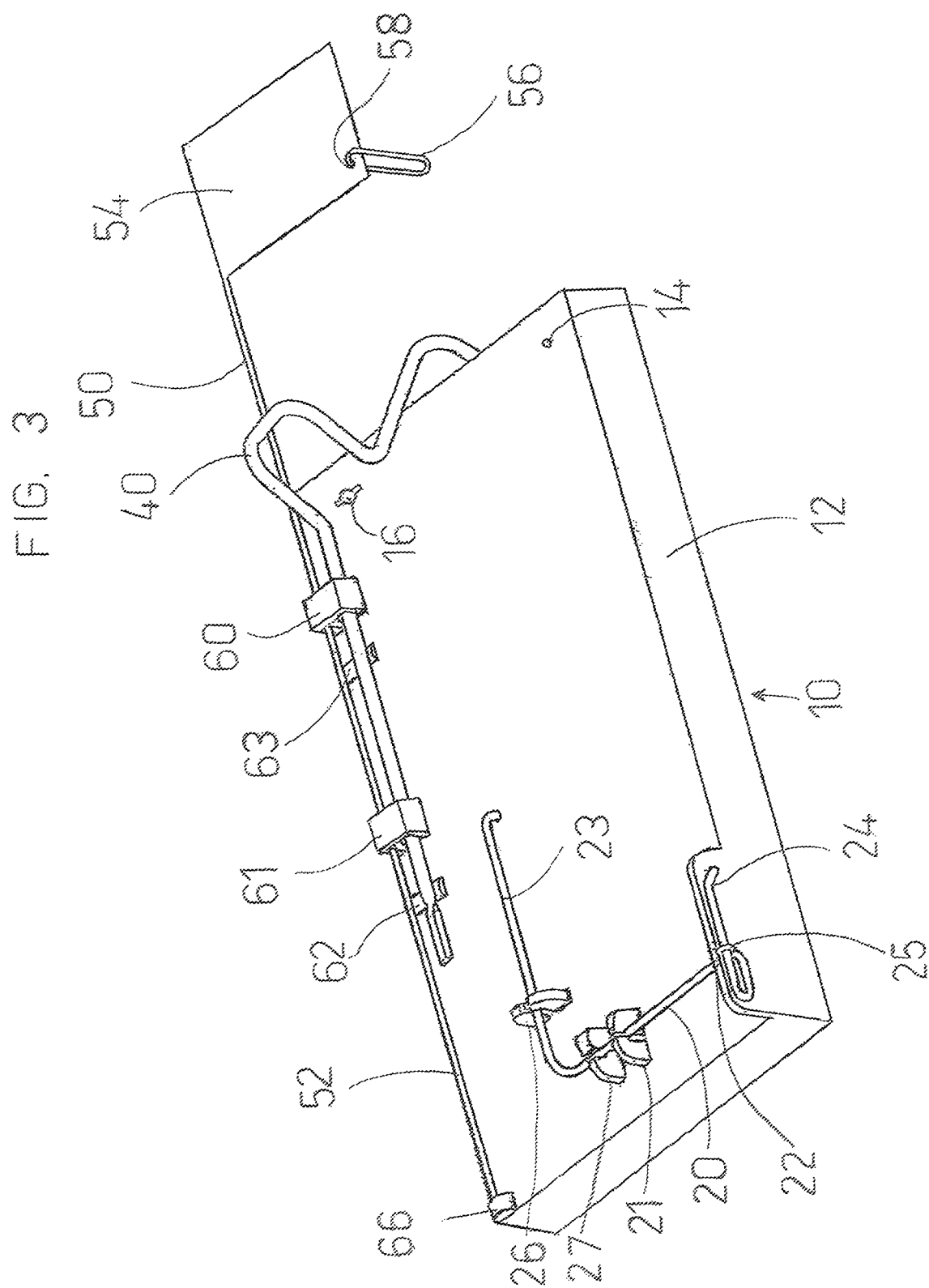
FIG. 3 is a view of the present invention showing the manner in which the rod holder, indicator flag, and trip mechanism are secured to the base during storage.

Referring now to the drawings and more specifically to FIGS. 1, 2 and 3 the simple triggering tip-up device 10 may consist of a base 12, an indicator flag 50, a trigger mechanism 20, and rod holder 40. Fishing line 36 fed from a reel 32 with an open bail 34 may be placed underneath the long leg 23 of the trigger mechanism 20. The indicator flag 50 is held down by sliding the release loop 56 onto the short leg 24 of the trigger mechanism 20. When a fish strikes and pulls on the fishing line 36 the long leg 23 of the trigger mechanism 20 is pulled up which simultaneously raises the short leg 24 of the trigger mechanism 20. The raising of the trigger mechanism 20 causes the release loop 56 to slide up the short leg 24 resulting in the release of the indicator flag 50. As the indicator flag 50 is being released, tension from the indicator flag shaft 52 causes the trigger mechanism 20 to be thrust forward resulting in the complete release of the fishing line 36.

FIGS. 1, 2 and 3 illustrate a base 12 of the simple triggering tip-up device 10 according to one embodiment. In the preferred embodiment the base 12 is constructed of rigid plastic, however a plank of wood or composite deck material could be utilized without limitations of the present invention. In the preferred embodiment the base 12 may be rectangular. The base 12 may be, however, any shape or size suitable to create a stable platform. The rod holder 40 is removably attached to the base 12 by inserting the bottom of the rod holder 40 into a slot 16 within the base 12. In the preferred embodiment the rod holder 40 is constructed of metal rod bent in an S-shape to cradle the butt 38 of a fishing rod 30. The rod holder 40 may be constructed of flat metal, PVC, or a rigid plastic. The rod holder 40 may also be attached to the base 12 whereby it is allowed to pivot between a stored position and a useful position. The indicator flag 50 is removably attached to the base 12 by inserting the bottom of the flag shaft 52 into an aperture 14 within the base 12. In the preferred embodiment the flag shaft 52 is constructed of fiberglass rod. The flag shaft 52 may be constructed of poly vinyl chloride (PVC) rod, spring steel, graphite rod or a metal rod with a spring base. In the preferred embodiment the flag 54 is constructed of a tear resistant plastic, although other materials could be used without altering the scope of the device. The outermost bottom corner of the flag 54 contains an aperture 58 where a release loop 56 is attached. In the preferred embodiment the release loop 56 is constructed of a continuous length of light gauge wire bent in an elongated loop although other materials could be substituted. The trigger mechanism 20 is fastened to the base 12 through an aperture 22 near the corner of the base 12 and a snap clip 21 near the center of the base 12. A cradle 27 is located adjacent to the snap clip 21 to support the trigger mechanism 20. When mounted to the base 12 the trigger mechanism 20 is allowed to rotate. The trigger mechanism 20 is constructed of metal rod bent in a U shape with a long leg 23 on one end and a short leg 24 on the opposing end. The long leg 23 is aligned with the rod holder 40 and the short leg 24 is aligned with the indicator flag 50. The long leg 23 of the trigger mechanism 20 is bent at a 90 degree radius at its end to provide a hook to secure the fishing line until a strike from a fish actuates the trigger mechanism 20.

The trigger mechanism 20 includes a slidable o-ring 25 affixed to the short leg 24 which creates a backstop for the release clip 56. Resistance is applied to the trip mechanism 20 from the stored energy of the flag shaft 52 when in the "set" position as shown in FIG. 1. This resistance can be adjusted by sliding the o-ring 25 forward or backward. Increased resistance is applied to the trip mechanism 20 by sliding the o-ring 25 towards the front of the base 12 and resistance is decreased by sliding the o-ring 25 towards the back of the base 12, which allows the resistance to be adjusted to match the size of the bait being utilized. A retainer snap clip 26 is affixed to the base 12 adjacent to the long leg 23 of the trigger mechanism 20 to secure the trigger mechanism 20 during transport and storage. A pair of stow hubs 60, 61 are aligned lengthwise along the edge of the base 12 to store the rod holder 40 and indicator flag 50 when not being used. The rod holder 40 and flag shaft 52 are slid through the appropriate openings of the stow hubs 60, 61 and the rod holder 40 hooks on the back of the base 12 while the flag shaft 52 rests against the flag shaft stop 66 during storage as illustrated in FIG. 3. A pair of resistance pads 62, 63 protrude from the base to provide resistance to the rod holder 40 and flag shaft 52 preventing them from sliding out while in their stowed positions.

Figure 4:
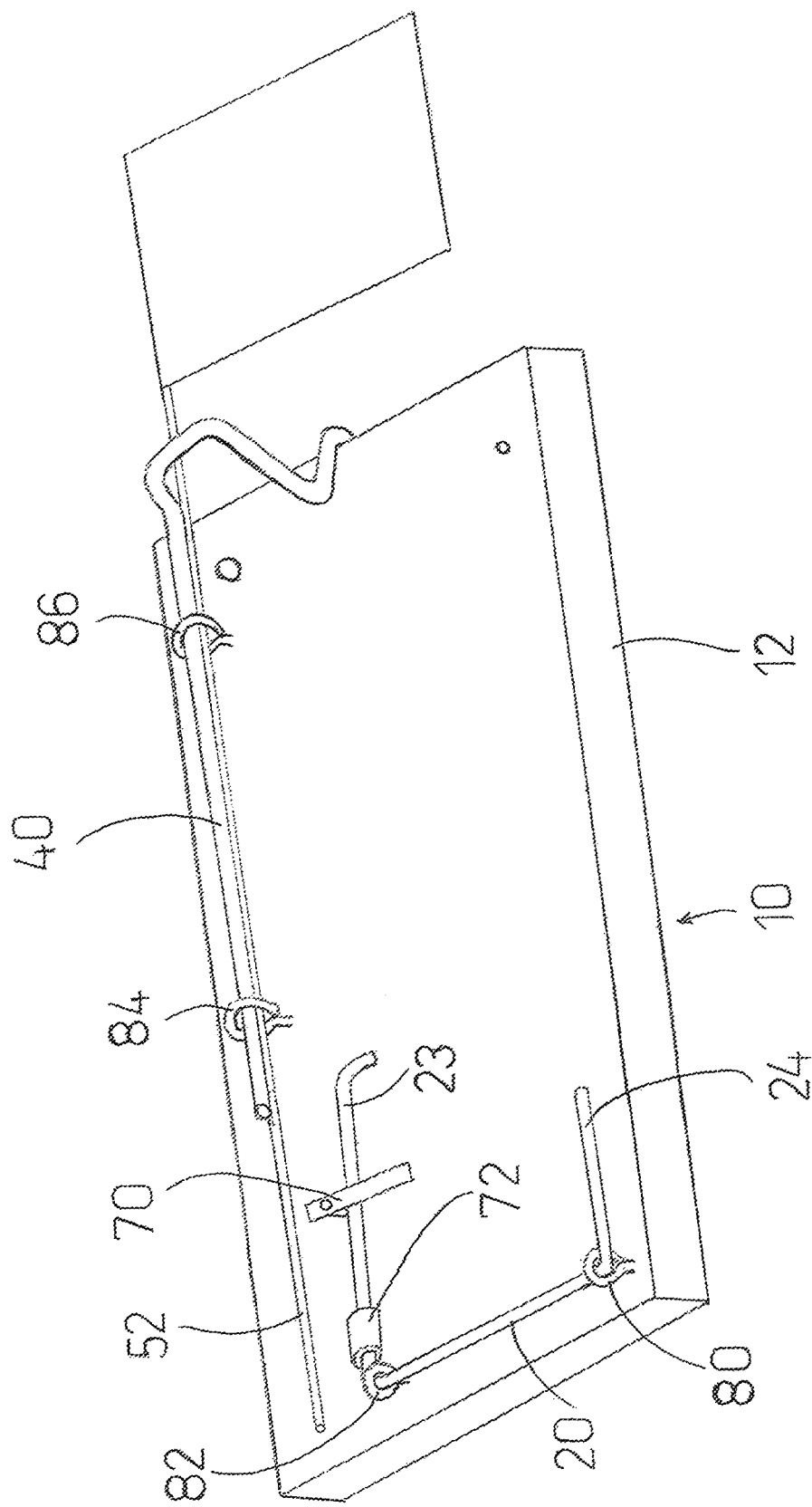
FIG. 4 is a view of an alternative embodiment of the present invention illustrating the manner in which the trip mechanism is constructed and fastened to the base and an alternate method of storing the rod holder and indicator flag.

An alternative embodiment of the present invention is illustrated in FIG. 4 which shows the simple triggering tip-up device 10 configured with a U-shaped trip mechanism 20 where the short leg 24 of the trip mechanism is bent only at 90 degrees to run parallel with the long leg 23. The trip mechanism 20 is mounted to the base 12 by a pair of aligned eyelets 80, 82. The eyelets 80, 82 are appropriately sized to allow the trip mechanism 20 to freely rotate within them. In this embodiment of the present invention the long leg 23 of the trip mechanism 20 has a slidable weight 72 affixed to it for the purpose of adding resistance to the trip mechanism 20. A flexible tension/retainer clip 70 is mounted to the base 12 adjacent to the long leg 23 of the trip mechanism 20. The tension/retainer clip 70 can be rotated to set on top of the long leg 23 of the trip mechanism 20 to provide added resistance when very large bait is being used and to secure the trip mechanism 20 during transport and storage. Additionally, this embodiment of the present invention also employs an alternate method of stowing the rod holder 40 and indicator flag 52 with a pair of eyelets 84, 86 mounted lengthwise on and near the edge of the base 12. The flag shaft 52 and rod holder 40 are inserted through the eyelets 84, 86 with the rod holder 40 positioned on top. The rod holder 40 hooks onto the back of the base 12 and the eyelets 84, 86 are rotated clockwise to secure the rod holder 40 and flag shaft 52 in place.

In operation of the simple triggering tip-up device 10, the rod holder 40 and indicator flag 50 are removed from their stowed position by pulling them out of the stow hubs 60,61. The rod holder 40 is inserted into a slot 16 within the base and orientated to face toward the front of the base 12. The indicator flag shaft 52 is inserted into an aperture 14 on the base 12 and the device is placed next to a hole that has been augered through the ice. The trip mechanism 20 is released from the stowed position by pulling it up and out of the retainer snap clip 26 and slid over to rest between the retainer snap clip 26 and cradle 27. Once the angler has determined the depth to set his bait the butt 38 of the fishing rod 30 is placed into the rod holder 40. With the bail 34 of the reel 32 open the fishing line 36 is placed under the long leg 23 of the trigger mechanism 20. The long leg 23 of the trigger mechanism 20 is lowered to rest on the base 12 securing the fishing line 36 between the long leg 23 of the trigger mechanism 20 and the base 12. The indicator flag 50 is bent over from its upright position and the release loop 56 is slid over the short leg 24 of the trigger mechanism 20 where it is placed against the o-ring 25 and the indicator flag 50 is "set". The slidable o-ring 25 can be slid down the shaft of the short leg 23 with the release loop 56 positioned against it for added resistance when using medium to large bait. When a fish strikes the bait and pulls on the fishing line 36 the long leg 23 of the trigger mechanism 20 is pulled upwards which simultaneously raises the short leg 24 upwards causing the release loop 56 to slide up the short leg 24 resulting in the release of the flag 54 to the upright position and alerting the angler of a fish strike. As the release loop 56 slides up the short leg, 24 tension from the flag shaft 52 thrusts the trigger mechanism 20 forward completely releasing the fishing line 36.

What is claimed is:

1. A device intended for use with a conventional fishing rod and reel, wherein the reel is supplied with fishing line that is released from an open bail, the device comprising:
   a base
   a rod holder attached to the base for inserting a fishing rod
   an indicator flag attached to the base
   a trip mechanism attached to the base and configured to secure the fishing line and to also hold the indicator flag in position
   whereby the action of a fish pulling on the fishing line raises the trip mechanism resulting in the release of the indicator flag, the released tension of the indicator flag causes the trip mechanism to be thrust forward assisting in the release of the fishing line.

2. The device of claim 1, wherein the indicator flag is positioned perpendicular to the base when released from the trip mechanism.

3. The device of claim 1, wherein the indicator flag can be removed from the base.

4. The device of claim 1, wherein the rod holder can be removed from the base.

5. The device of claim 1, further comprising a means for storing the rod holder and the indicator flag longitudinally on the base.

6. The device of claim 1, wherein the indicator flag comprises a flexible shaft, a flag, and a release loop.

7. The device of claim 1, further comprising an adjustable o-ring attached to the trip mechanisms short leg.

8. The device of claim 1, further comprising a retainer clip mounted to the base for securing the trip mechanism during storage.

9. The device of claim 7, wherein the o-ring can be moved forward or backward to provide various resistance settings to the trigger mechanism provided by the tension of the indicator flag shaft while in the set position.

10. The device of claim 1, wherein the base is rectangular in shape.

11. A device intended for use with a conventional fishing rod and reel, wherein the reel is supplied with fishing line that is released from an open bail, the device comprising:
    a base
    a rod holder attached to the base for inserting a fishing rod
    an indicator flag attached to the base
    a trip mechanism attached to the base and configured to secure the fishing line and to also release the indicator flag,
    whereby the action of a fish pulling on the fishing line raises the trip mechanism resulting in the release of the indicator flag, the released tension of the indicator flag causes the trip mechanism to be thrust forward resulting in the complete release of the fishing line.

12. The device of claim 11, further comprising a means for storing the rod holder and the indicator flag longitudinally on the base.

13. The device of claim 11, further comprising a weight slidably attached to the trip mechanism.

14. The device of claim 11, further comprising a tension-retainer clip mounted to the base.

15. The device of claim 14, wherein the tension-retainer clip provides added tension to the trigger mechanism and secures the trigger mechanism during storage.

16. The device of claim 1, wherein the base is rectangular in shape.

* * * * *